(12) United States Patent
Gil et al.

(10) Patent No.: US 12,078,737 B2
(45) Date of Patent: *Sep. 3, 2024

(54) SURVEYING SYSTEM

(71) Applicants: Jesse Gil, La Mirada, CA (US); Ronald D. Shaw, Costa Mesa, CA (US); Jeff Counterman, Costa Mesa, CA (US)

(72) Inventors: Jesse Gil, La Mirada, CA (US); Ronald D. Shaw, Costa Mesa, CA (US); Jeff Counterman, Costa Mesa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/329,453

(22) Filed: Jun. 5, 2023

(65) Prior Publication Data
US 2023/0314628 A1 Oct. 5, 2023

Related U.S. Application Data

(63) Continuation of application No. 17/226,960, filed on Apr. 9, 2021, now Pat. No. 11,714,201, which is a (Continued)

(51) Int. Cl.
*G01S 19/46* (2010.01)
*G01S 5/00* (2006.01)
(Continued)

(52) U.S. Cl.
CPC ............. *G01S 19/46* (2013.01); *G01S 5/00* (2013.01); *G01S 5/0063* (2013.01); *G01S 5/14* (2013.01);
(Continued)

(58) Field of Classification Search
CPC .......... G01S 19/46; G01S 5/00; G01S 5/0063; G01S 5/14; G01S 19/14; G05D 1/00; G01C 15/00
See application file for complete search history.

(56) References Cited

U.S. PATENT DOCUMENTS

| 4,727,374 A | 2/1988 | Boulais |
| 6,094,625 A | 7/2000 | Ralston |

(Continued)

FOREIGN PATENT DOCUMENTS

WO WO-2016019356 A1 * 2/2016 ............. G01S 19/14

OTHER PUBLICATIONS

International Search Report and Written Opinion for International Application No. PCT/US15/43323, dated Oct. 20, 2015, 9 pages.

*Primary Examiner* — Yonel Beaulieu
(74) *Attorney, Agent, or Firm* — Stetina Brunda Garred & Brucker

(57) ABSTRACT

A surveying system for a construction site has a restricted antenna system with a plurality of fixed location antennas each defined by a set of location data associated with a specific deployment position. The surveying system also has a computing device with a data processor and a display screen. A communications module establishes a data transfer link with the restricted antenna system over which spatial data for distances between current positions of the computing device and one or more of the plurality of fixed location antennas are received. The computing device is loadable with project drawings corresponding to the construction site and displayable on the display screen. A position marker is overlaid on the display of the project drawing at a position thereon corresponding to a computing device location value derived from the spatial data and the location data of one or more of the fixed location antennas.

22 Claims, 9 Drawing Sheets

Related U.S. Application Data continuation of application No. 16/422,775, filed on May 24, 2019, now Pat. No. 10,996,344, which is a continuation of application No. 15/700,367, filed on Sep. 11, 2017, now Pat. No. 10,345,453, which is a continuation of application No. 14/815,820, filed on Jul. 31, 2015, now Pat. No. 9,846,242.

(60) Provisional application No. 62/032,194, filed on Aug. 1, 2014.

(51) Int. Cl.
*G01S 5/14* (2006.01)
*G01S 19/14* (2010.01)
*G05D 1/00* (2024.01)
*G01C 15/00* (2006.01)

(52) U.S. Cl.
CPC .............. *G01S 19/14* (2013.01); *G05D 1/00* (2013.01); *G01C 15/00* (2013.01)

(56) References Cited

U.S. PATENT DOCUMENTS

| | | |
|---|---|---|
| 6,825,793 B2 | 11/2004 | Taylor et al. |
| 7,737,965 B2 | 6/2010 | Alter et al. |
| 7,869,944 B2 | 1/2011 | Deaton et al. |
| 8,060,344 B2 | 11/2011 | Stathis |
| 8,935,057 B2 | 1/2015 | Dolinar et al. |
| 9,298,991 B2 | 3/2016 | Dolinar et al. |
| 9,581,443 B2 | 2/2017 | Gil |
| 9,784,843 B2 | 10/2017 | Dolinar et al. |
| 9,846,242 B2 | 12/2017 | Gil |
| 10,345,453 B2 | 7/2019 | Gil |
| 10,996,344 B2 | 5/2021 | Gil |
| 2006/0235611 A1 | 10/2006 | Deaton et al. |
| 2007/0052951 A1 | 3/2007 | Van Cranenbroeck |
| 2010/0189312 A1 | 7/2010 | Nielsen et al. |
| 2011/0000095 A1 | 1/2011 | Carlson |
| 2011/0043515 A1 | 2/2011 | Stathis |
| 2013/0096873 A1 | 4/2013 | Rosengaus et al. |
| 2013/0138606 A1 | 5/2013 | Kahle et al. |
| 2013/0184938 A1 | 7/2013 | Dolinar et al. |
| 2013/0190981 A1 | 7/2013 | Dolinar et al. |
| 2013/0245946 A1 | 9/2013 | Carlson et al. |
| 2014/0125651 A1 | 5/2014 | Sharp et al. |
| 2014/0163775 A1 | 6/2014 | Metzler |
| 2014/0210663 A1 | 7/2014 | Metzler |
| 2014/0274116 A1 | 9/2014 | Xu et al. |
| 2015/0127223 A1 | 5/2015 | Dolinar et al. |
| 2016/0033652 A1* | 2/2016 | Gil ............... G01S 19/46 342/357.29 |
| 2023/0314628 A1* | 10/2023 | Gil ............... G01S 5/0063 342/357.29 |

* cited by examiner

BLUEPRINT NAVIGATION

*58*     DOWNLOAD DRAWINGS

NEW JOB FILE NAME   | *59* |

FILE SOURCE   | 3D, CAD | BIM | 3D SCANNER |
           *60a*     *60b*     *60c*

LAYER NAME   | *62* |

FIG. 9

SYNC - CN HD   *64*

BCDN
BUILDING CONSTRUCTION DRAWINGS (BLUEPRINT) NAVIGATION

YES    NO

PAIRED:   [✓]   [ ] ← *66*

SYNC:   [✓]   [ ] ← *68*

FIG. 10

SURVEYING SYSTEM

CROSS-REFERENCE TO RELATED APPLICATIONS

This application is a continuation of U.S. Application Ser. No. 17/226,960, filed Apr. 9, 2021, Now U.S. Pat. No. 11,714,201, issued Aug. 23, 2001, which is a continuation of U.S. application Ser. No. 16/422,775, filed May 24, 2019, now U.S. Pat. No. 10,996,344, issued May 4, 2021, which is a continuation of U.S. application Ser. No. 15/700,367, filed Sep. 11, 2017, now U.S. Pat. No. 10,345,453, issued Jul. 9, 2019, which is a continuation of U.S. application Ser. No. 14/815,820, filed Jul. 31, 2015, now U.S. Pat. No. 9,846,242, issued Dec. 19, 2017, which relates to and claims the benefit of U.S. Provisional Application No. 62/032,194, filed Aug. 1, 2014 and entitled RESTRICTED CONTROLLED SURVEYING NAVIGATION SYSTEM and U.S. Provisional Application No. 62/032,223, filed Aug. 1, 2014 and entitled CONSTRUCTION DRAWING NAVIGATION SYSTEM, the entire disclosures of which are hereby wholly incorporated by reference herein.

STATEMENT RE: FEDERALLY SPONSORED RESEARCH/DEVELOPMENT

Not Applicable

BACKGROUND

1. Technical Field

The present disclosure relates generally to surveying systems. More particularly, the present disclosure relates to surveying and construction drawing navigation systems that may utilize a restricted antenna system and a Global Positioning System (GPS)-enabled handheld device to spatially locate the device within a planned site, with the construction drawings displayed on the device.

2. Related Art

Surveying is the technique of accurately determining the three-dimensional position of points and the distances and angles between them, utilizing in part geometry and trigonometry. In surveying, various kinds of surveying instruments, such as theodolites or total stations, are commonly used for measuring distances and/or angles of objects. Conventionally, these surveying instruments are mounted on a stand to stably position the surveying instrument on the ground and have a head that may be moved with respected to the stand. The head generally includes an optical device, such as a ranging or sighting device for focusing on an object.

Typically, construction drawings are made up of a site layout plan and a floor plan, which will contain gridlines for the desired dimensions of the construction. In order to establish the gridlines at the construction site, a surveying team will take a government land survey plan featuring true coordinate control points, will establish control points at the construction site, and will then proceed to set out the gridlines at the construction site. This is typically achieved by one surveyor manning a total station at a known given point, or "monument," and at least one additional surveyor manning a target and physically moving the target into sight of the total station at set locations to establish the gridlines. This method, however, can be cumbersome in that it requires a team of skilled surveyors to man the total station and the targets to physically mark the control lines.

Improvements to this method are known in the art, for example, total stations now allow for the construction drawings to be loaded directly into the total station, thereby having the points and elevations contained within the system to speed up and simplify the process of targeting the specific points. However, even with this improvement a team of surveyors is still needed to man the total station and to physically move the target around the construction site.

Further improvements known in the art include remotely controlled total stations, wherein a single surveyor may remotely operate the total station while moving the target from location to location and viewing the sight of the total station via a remote viewing device. However, this still requires a skilled surveyor to operate the total station and move the target from point to point.

Regardless of the improvements described above, laying out the control points and gridlines is time consuming and inefficient. In particular, laying out the control points and gridlines must be performed numerous times during construction. At the very least, each subcontractor must perform their own laying out of control points and gridlines to properly perform their services. Further, the gridlines can be disturbed during construction and/or during periods of inactivity (such as overnight periods between construction). As such, the laying out of gridlines and control points may need to be performed as often as daily. Accordingly, it can be seen that this repetition of laying out the gridlines and control points is a point of inefficiency in the construction process.

As such, there is a need for an improved surveying system that allows for users to quickly and easily locate themselves within the site, and for the one time establishment of site construction control points in an efficient manner without the need to repeat the process frequently. Additionally, there is a need for a system to graphically locate a user of the system within the site and to visually display the location in relation to the site layout plan or the floor plan of the intended construction.

BRIEF SUMMARY

One embodiment of the present disclosure is a surveying navigation system having a restricted antenna system in communication with a computing device. The restricted antenna system may be comprised of a plurality of fixed location antennas located on known coordinates. By locating the fixed location antennas on known coordinates, the location of the computing device can be precisely triangulated. The fixed location antennas may have GPS units integrated therein to allow for placement at predetermined locations. Alternatively, the fixed location antennas may be placed manually using standard surveying techniques in relation to a monument on the site at a known location. For example, a first one of the fixed location antennas may be placed directly at the site of the monument, and the remaining fixed location antennas placed in relation to the first. Alternatively, all of the fixed location antennas may be placed in relation to the monument. The fixed location antennas may then communicate with each other to verify their placement and accurate distance from one another. Location data may also be obtained from GPS units that are integrated with the computing device.

The computing device may be loaded with drawings, such as standard CAD or BIM files known in the art. A display on the computing device is capable of rendering and displaying the drawing files that may contain specific site information, such as the site plan or floor plan. The precise location of the device, realized by triangulation of the position of the device within the restricted antenna system, may then be superimposed upon the display of the site information in a real-time fashion. Further, the size of the computing device would be accounted for within its programming to precisely and accurately locate the device within the site or floor plan. For example, the programming of the computing device would factor in whether the location device was a phone, or a tablet, or a dedicated location device for use with the surveying navigation system, and the size of each device would be addressed so that the end point of the display would precisely reflect its location.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 9 is an exemplary screen capture of a project management user interface; and FIG. 10 is an exemplary screen capture of a project drawing and location data pairing and synchronization setup interface.

DETAILED DESCRIPTION

The detailed description set forth below is intended as a description of the presently preferred embodiment of the disclosure, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
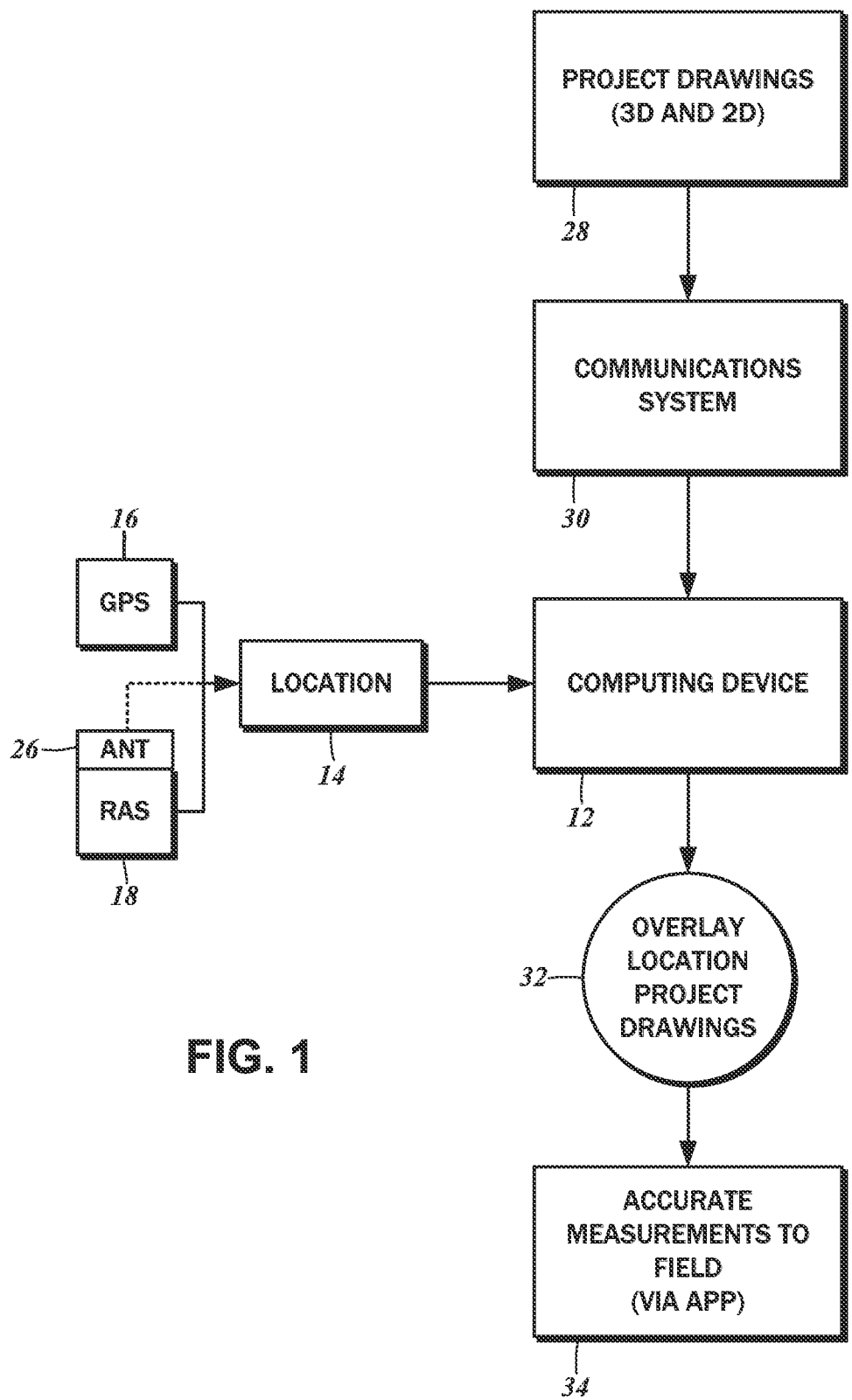
FIG. 1 is a block diagram depicting the various components of a surveying system in accordance with one embodiment of the present disclosure.

The block diagram of FIG. 1 is of one embodiment of a surveying system 10 according to the present disclosure. The surveying system 10 is understood to include a computing device 12 that is portable and readily carried by a single user. As will be described in further detail below, the computing device 12 is capable of displaying the location within a construction site at which the computing device 12 is positioned, together with architectural drawings and schematics that aid construction personnel.

It is contemplated that the computing device 12 is a standard general purpose, consumer-level mobile device such as a cellular phone or a tablet. In this regard, the computing device 12 may have a data processor that can execute pre-programmed instructions that, among others, implement the methods contemplated by the present disclosure. Furthermore, the computing device 12 may have a memory to store these pre-programmed instructions, along with various data pertaining to the construction site. The data processor may also execute the instructions comprising a device operating system that manages the various input and output functions. In this regard, the computing device 12 may have a display unit that is combined with a touch screen overlaid thereon. A user may interact with various graphic elements generated on the display unit with the touch screen to invoke functions corresponding to those graphic elements. Some implementations of the present disclosure also contemplate user interfaces that provide useful data to construction personnel, and those interfaces will be described in further detail below. Notwithstanding the use of a conventional mobile device for the computing device 12, it is also contemplated that specialized or dedicated devices incorporating only those features of the present disclosure can be utilized.

In various embodiments, the computing device 12 receives location data 14, which may be generated by an on-board GPS module 16 and/or by a restricted antenna system (RAS) 18. According to one embodiment, the location data 14 is used to locate the computing device 12 spatially within an accuracy range of fifteen feet to less than one inch.

Figure 2:
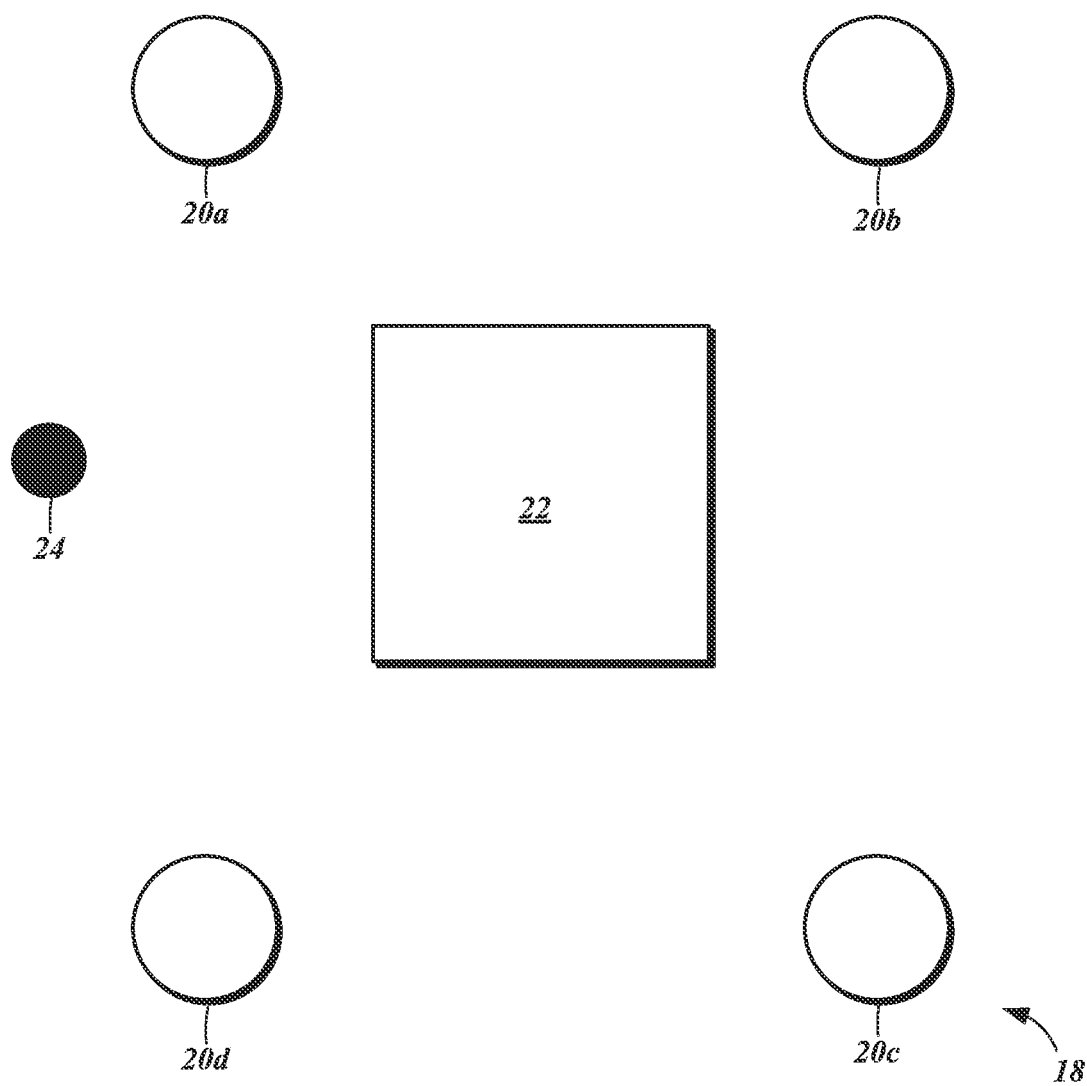
FIG. 2 is a representation of a restricted antenna system utilized in various embodiments of the present disclosure.

With reference to the diagram of FIG. 2, a restricted antenna system 18 is made up of a plurality of fixed location antennas located on site at specific coordinates. Typically, a minimum of three fixed location antennas will be required to triangulate the location of the computing device 12 precisely. However, in certain situations fewer than three, or more than three, fixed location antennas may be utilized in the restricted antenna system. For example, when construction of a mostly square or rectangular shaped building is contemplated, the restricted antenna system 18 may utilize four fixed location antennas 20a, 20b, 20c, and 20d placed outside of the four corners of the intended building site 22. By locating the fixed location antennas 20 on known coordinates, the location of the computing device 12 can be precisely triangulated.

The fixed location antennas 20 may be placed at previously known landmarks or coordinates, via conventional surveying methods, or via the use of GPS coordinates. In order to provide the greatest accuracy, it is envisioned that at least three, and preferably four, fixed location antennas 20 are placed on known coordinates. The fixed location antennas 20 may have onboard GPS devices to allow for their precise location determination. The onboard GPS devices may be capable of determining location within an accuracy range fifteen feet to less than one inch.

Alternatively, the fixed location antennas 20 may be placed manually using standard surveying techniques in relation to a monument 24 on the site at a known location. For example, a first one of the fixed location antennas 20a may be placed directly at the site of the monument 24, and the remaining fixed location antennas 20b, 20c, and 20d placed in relation to the first. All of the fixed location antennas 20 may be placed in relation to the monument 24. The fixed location antennas 20 may then communicate with each other to verify their placement and accurate distance from one another. The fixed location antennas 20 are configured to communicate with (and transmit/receive data to and from) each other and the computing device 12 to accurately determine distance and position in relation to each other to verify they are properly located. This communication may be achieved by conventional communication methods, such as by radio frequency or any other communication means known within the art, for example, infrared, microwave, and/or ultrasonic communication.

A portable antenna 26 may be utilized to report the location data 14 to the computing device 12 from the restricted antenna system 18. This portable antenna 26 may either improve the communication capabilities of the computing device 12 or may, for example when the computing device 12 is a standard consumer level cellular phone or tablet, completely provide the communication capabilities with the restricted antenna system 18. The portable antenna 26 may be a signal measuring device capable of receiving and/or transmitting data to and from the restricted antenna system 18. The portable antenna 26 may be able to utilize known communication modalities, such as radio frequency, infrared, microwave, or ultrasonic frequencies. It is contemplated that the portable antenna 26 may communicate with the computing device 12 by way of a standard connector cable, may be integrated into an external case form factor that attaches directly to the computing device 12, or may even communicate with the computing device 12 by standard wireless protocols such as Bluetooth, Wi-Fi, or the like.

As indicated above, the data processor of the computing device 12 can execute various pre-programmed instructions. It is expressly contemplated that software applications separate from the aforementioned operating system may also be loaded on to the computing device 12. The software application may be configured to retrieve project drawings 28 from a remote source for storage on the computing device 12. The project drawings 28 may be standard computer aided design (CAD) files, building information modeling (BIM) files Portable Document Format (PDF) files, and so on, and is intended to encompass all types of graphics data, including two-dimensional data and three-dimensional data that can be rendered by the computing device 12. By way of example only and not of limitation, the content of the graphics data, that is, the project drawings 28, may be architectural design software files containing specific site information, such as the site plan or floor plan, renderings of intended construction, and so forth.

The project drawings 28 can be transferred to the computing device 12 over a communications system 30. As depicted in FIG. 1, the communications system 30 is intended to encompass the wireless data networking components incorporated into the computing device 12, and the data networking components of the source of the project drawings 28, along with any intermediate data transfer connections between such components.

Figure 3:
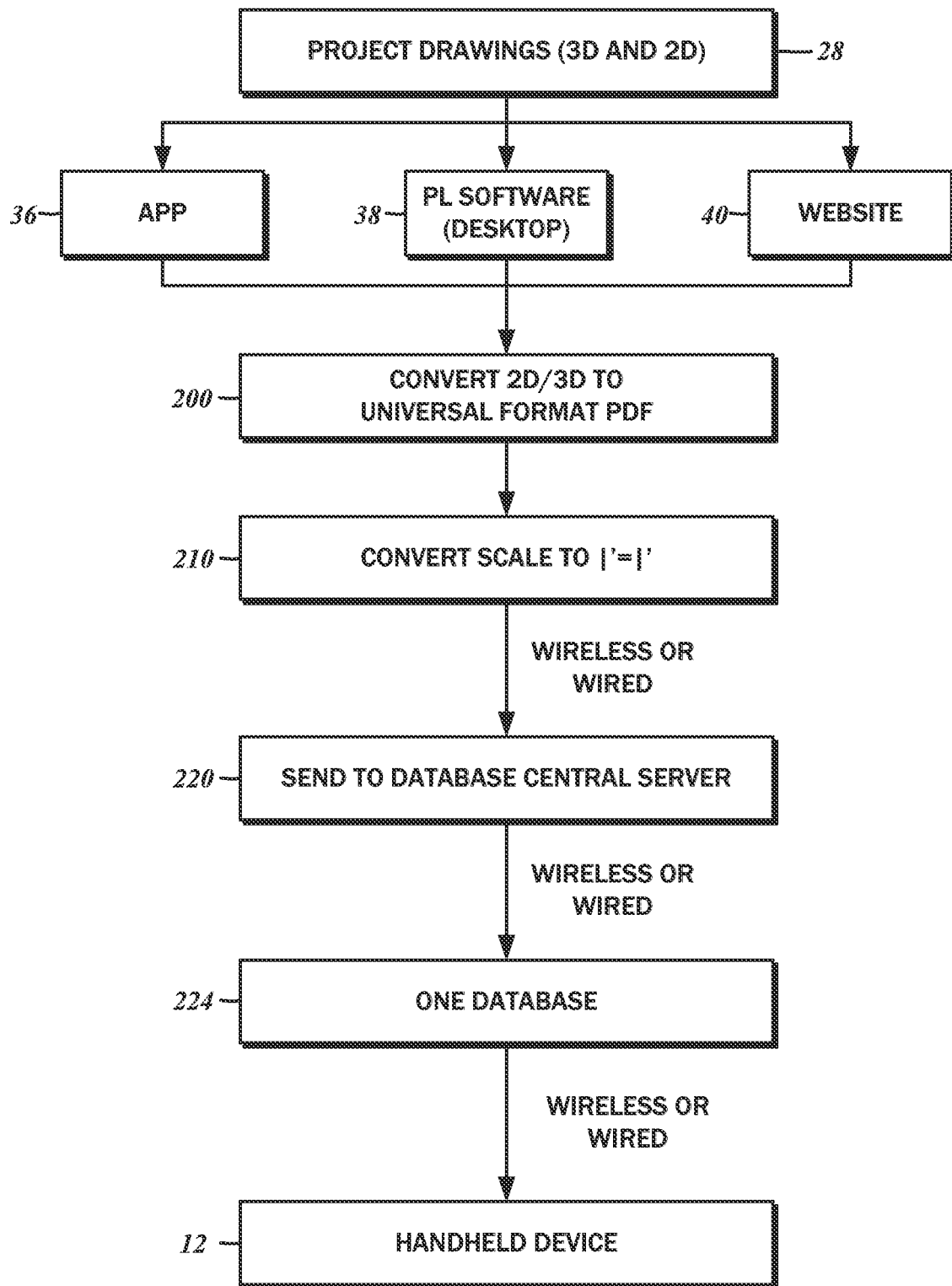
FIG. 3 is a flowchart depicting one aspect of the present disclosure involving the loading of project drawings on to a computing device.

With reference to the flowchart of FIG. 3, the specific steps involved in loading the project drawings 28 on to the computing device is disclosed. In accordance with one embodiment, this procedure may take place on one of an app 36 being executed on the computing device 12, an architectural plan software 38 running in a conventional desktop computing environment, or a web-based application that is accessible via a website 40. The app 36, the architectural plan software 38, or the website 40 accepts the project drawings 28, and to the extent necessary for the particular file format of the received project drawings 28, it may be converted into a universal format according to a step 200. In one embodiment, the universal format may be the aforementioned PDF format. The scale utilized in the project drawings 28 (with respect to real-world measurements) is typically encoded within the file itself, and is understood to be variable. Thus, in a step 210, the specific scale set forth in the project drawings 28 is converted or otherwise matched to a common scale.

The converted and scale-adjusted project drawings 28 are then sent to a remote, hosted central server in accordance with a step 220, and stored in a database per step 224. The transmission of the project drawings 28 to the central server may be by way of a wireless data transfer modality (such as Wifi) or a wired data transfer modality, or a combination of both. Any appropriate data transfer modality may be utilized without departing from the scope of the present disclosure. From the database, the computing device 12 may generate a query for a specific one of the project drawings 28 for retrieval.

Referring again to the block diagram of FIG. 1, In accordance with the present disclosure, the computing device 12 renders the selected project drawings 28, and the specific location within the site as designated by the location data 14 is overlaid 32 and aligned to the project drawing 28. As a result, the user/construction personnel is able to determine the specific location at the construction site, and accurate measurements to field 34 are possible. The computing device 12 is understood to be capable of factoring in its size, such that the end point of the display on the computing device 12 would precisely reflect its location within the project drawings presented on the display.

Figure 4:
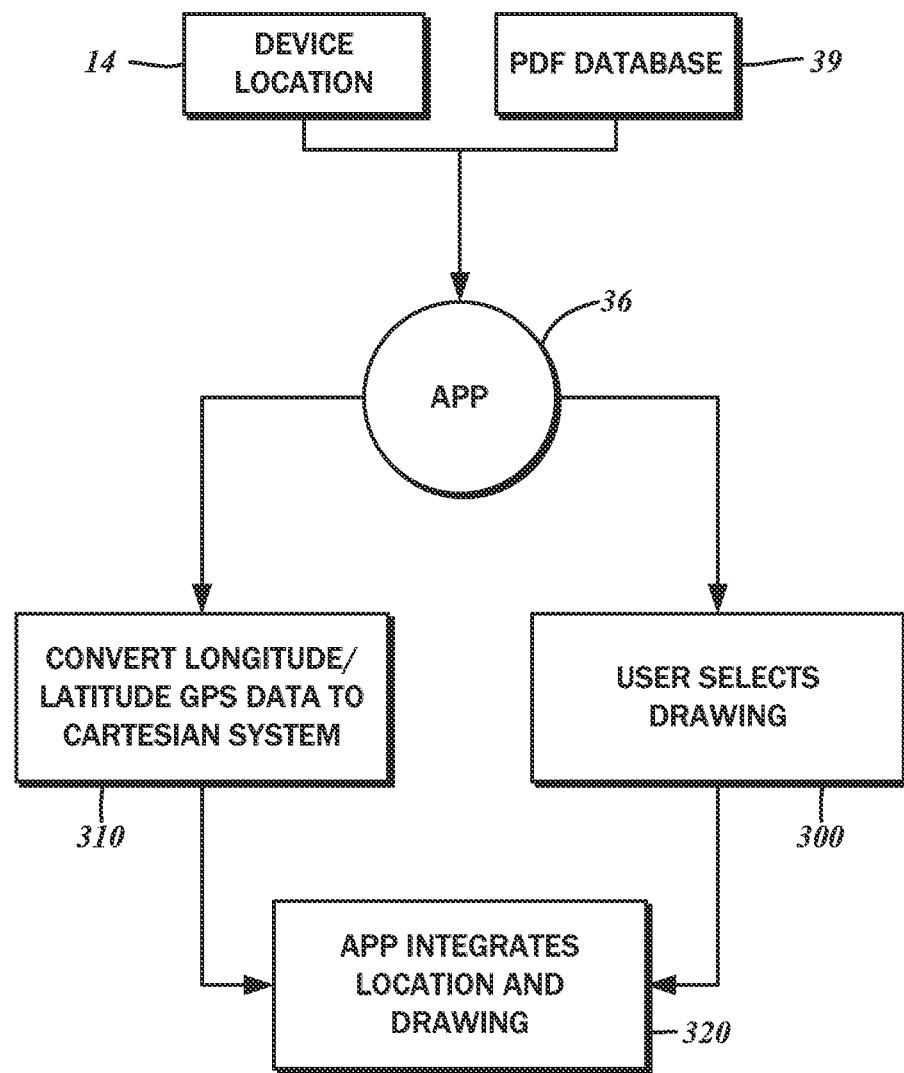
FIG. 4 is a flowchart depicting another aspect of the present disclosure involving the integration of the display of the project drawings with the location of the computing device as reported thereto.

The flowchart of FIG. 4 depicts the process of integrating the display of the project drawings 28 with the location of the computing device 12 as reported by the GPS module 16 or the RAS 18. The location data 14 and the project drawings 28 stored on a central database 39 are understood to be inputs to the app 36 that is running on the computing device 12. In a step 300, the user selects the particular project drawing 28 to render on the display of the computing device 12. In one implementation the location data 14 from the GPS module 16 may be provided as a longitude/latitude data, and so it may be converted to Cartesian coordinates (given in x, y, and z values) according to a step 310. This is understood to be separate and independent of the step 300, though it may occur substantially contemporaneously. Thereafter, in a step 320, the app 36 integrates the reported location with the display of the selected project drawing 28 and generates an indicator at the corresponding location on the display thereof. Thus, it is possible for the user to find and view the precise location at which the computing device 12 is positioned in the physical world, relative to the same location on the project drawing 28 as rendered on the computing device 12.

Figure 5:
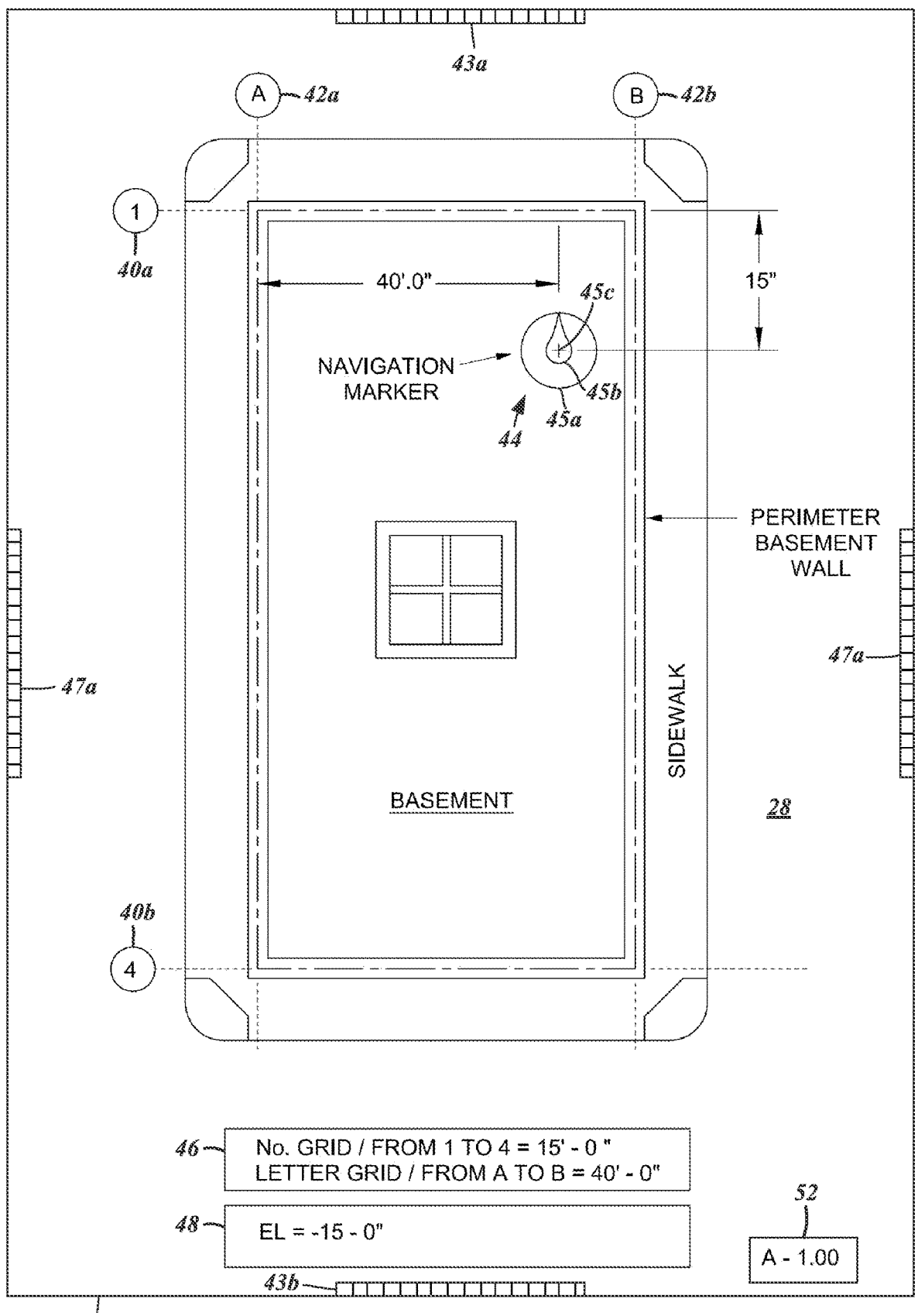
FIG. 5 is an exemplary screen capture of the project drawing overlaid with a navigation marker and distance legends.

The screen capture of FIG. 5 represents an exemplary display of the project drawing 28 overlaid with the location data 14 in an interface 29 of the computing device 12. The project drawing 28 is of a greatly simplified architectural site plan of the building site 22 that is a rectangular basement defined by a perimeter wall 31 and surrounded by a sidewalk. The numerical markers 40a, 40b correspond to the horizontal gridlines on the site plan, while the alphabetical markers 42a, 42b correspond to the vertical gridlines on the site plan. In accordance with one embodiment, there is a navigation marker 44 that pinpoints the current position of the computing device 12 relative to the building site 22. So that the navigation marker 44 is readily ascertainable when overlaid on the project drawing 28, there may be an oversized circular outline 45a that draws the attention of the viewer/user. A teardrop shaped marker element 45b further highlights the navigation marker 44, while center crosshairs 45c allow precise positioning of the computing device 12 to a physical feature within the building site 22. The particular visual configuration of the navigation marker 44 is presented by way of example only, and any other suitable design may be substituted without departing from the present disclosure.

Also included within the interface 29 are a set of vertical axis indicators 43a, 43b and horizontal axis indicators 47a, 47b. According to one embodiment, the navigation marker 44 may be moved by the user to a desired location within the project drawing 28 as a target position for the computing device 12. The user then moves the computing device 12 to the marked location, and as it approaches the target position, the horizontal and vertical axis indicators 43, 47 may change color to indicate the degree of proximity. In this regard, the crosshairs 45c are understood to be overlaid on a position in the project drawing 28 that corresponds to the physical location within the building site 22 where the vertical axis indicators 43 and horizontal axis indicators 47 physically intersect. It is understood that the computing device 12 is laid flat such that the x and y planes are parallel for a proper designation of the location, and to the extent there is any degree of roll or yaw, opposing indicators 43a, 43b and 47a, 47b are appropriately modified.

Also overlaid on the display of the project drawing 28 is a first legend 46 that, by way of example, indicates the real distance between the horizontal gridlines (x-axis), as well as between the vertical gridlines (y-axis). In a second legend 48, the detected elevation (z-axis) of the computing device 12 may be shown. Thus, as the computing device 12 is moved about the building site 22, the information on the first legend 46 is updated. Further, as the computing device 12 is moved up and down relative to the ground, the information on the second legend 48 is updated.

Figure 6:
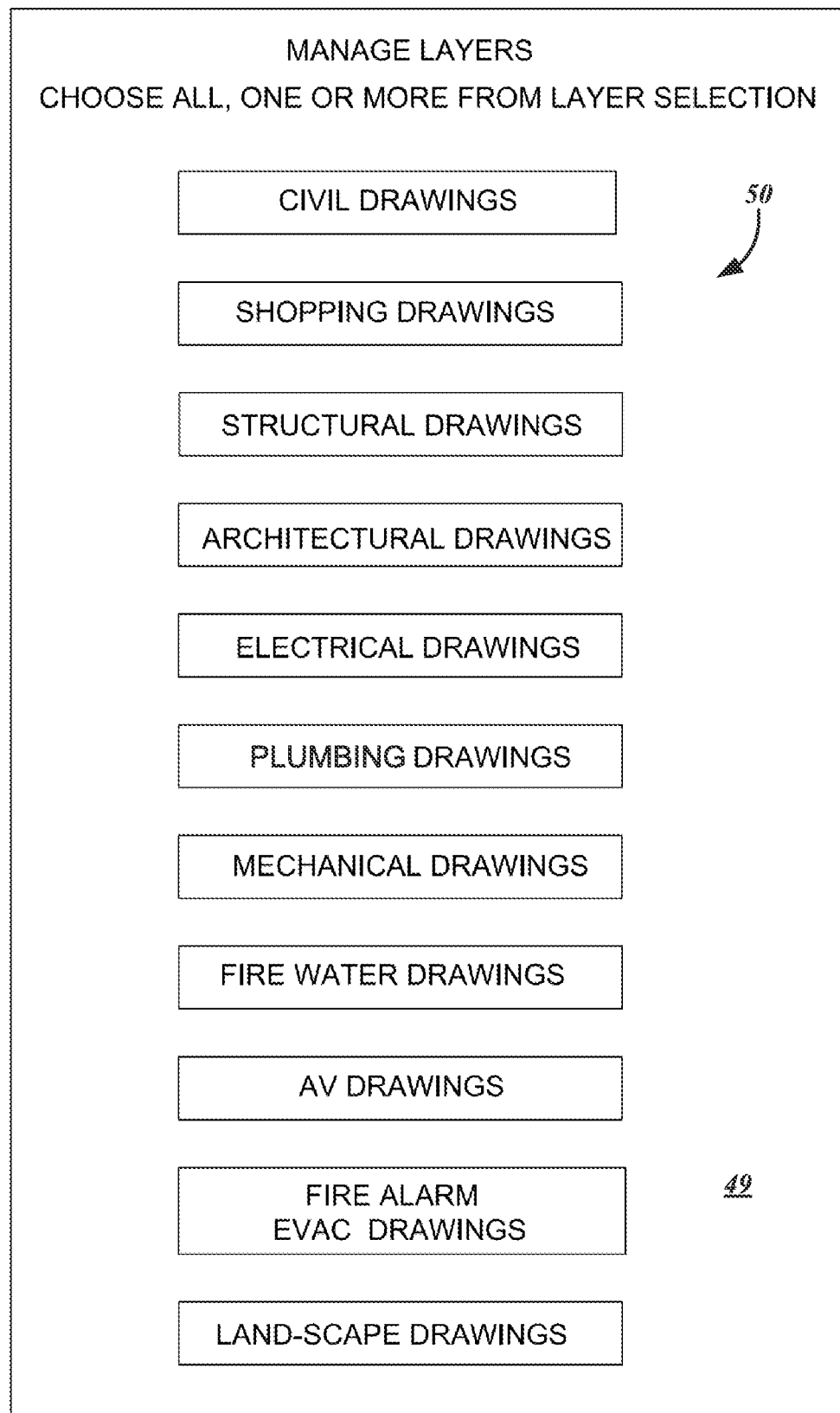
FIG. 6 is an exemplary screen capture of an interface for selecting different project drawings to be rendered on the computing device.

In the illustrated example, the project drawing 28 that is displayed is a single architectural site plan. It is expressly contemplated, however, that additional drawings likewise spatially coordinated with the physical locations of the building site 22 may be presented on the display of the computing device 12. The screen capture of FIG. 6 shows an interface 49 by which additional layers/drawings can be selected for viewing, and is comprised of a plurality of activatable buttons 50 corresponding to each such available project drawing 28. These other subsets of project drawings 28 may include, for example, civil engineering drawings, structural drawings, electrical drawings, plumbing drawings, mechanical drawings, fire control systems drawings, audio-visual wiring drawings, and landscape drawings. Referring again to the screen capture of FIG. 5, the interface 49 may be invoked by selecting a page selection button 52, which indicates "A—1.00", referring to architectural drawings, page 1.

Figure 7:
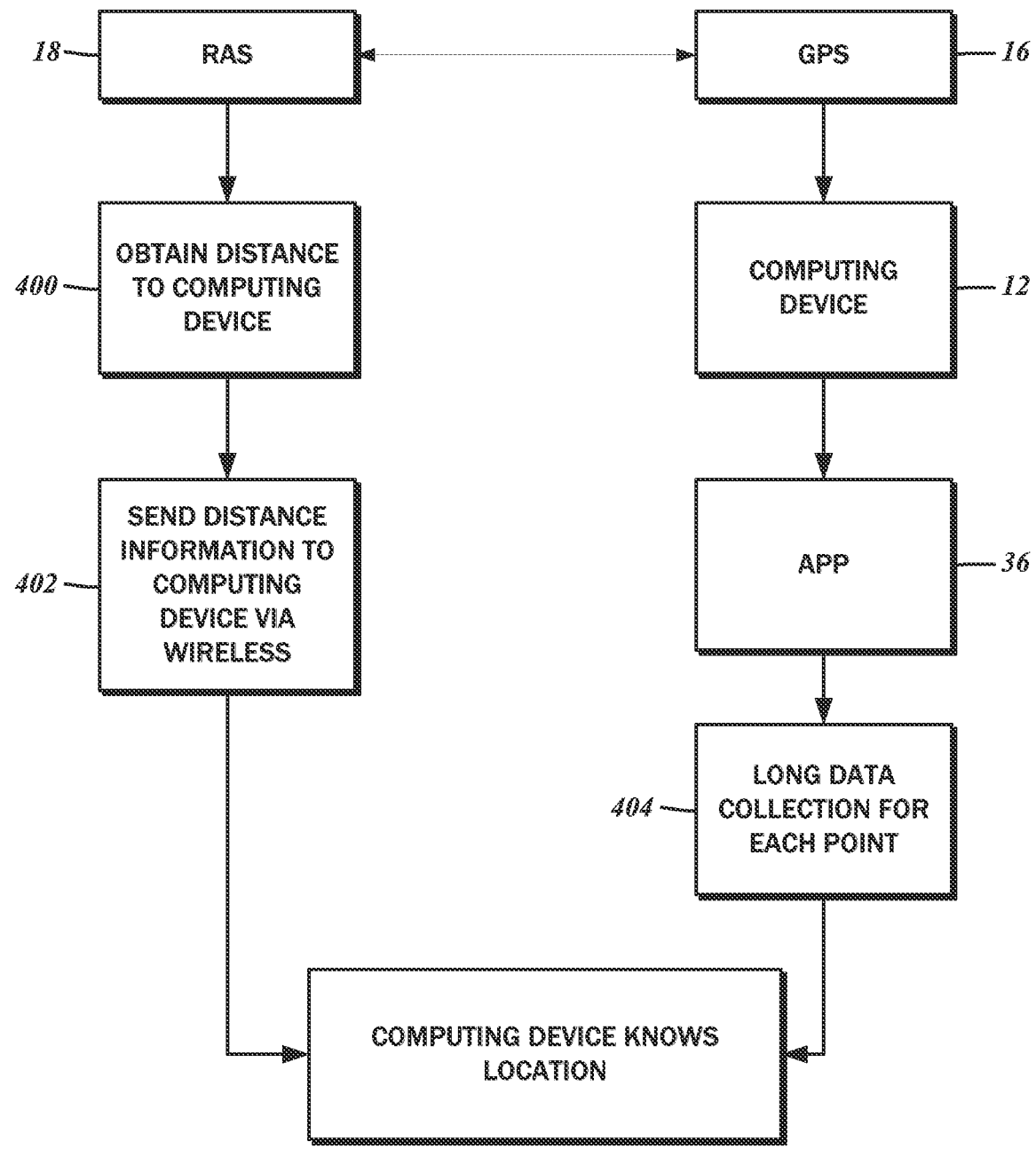
FIG. 7 is a flowchart depicting an aspect of the present disclosure involving the capture and reporting of location data.

As the computing device 12 is positioned at different locations around the building site, the view of the project drawing 28 as well as that of the navigation marker 44 is understood to be updated. Referring now to the flowchart of FIG. 7, additional details regarding the capture of the location data 14 will be described. Again, the computing device 12 may obtain location data 14 from either the GPS module 16 or the restricted antenna system 18.

Measurements from the RAS 18 are understood to be highly accurate, or at least more accurate than the measurements from the GPS module 16. In some embodiments, accuracy within ~7 cm is understood to be possible. The RAS 18 is understood to be the most suitable for navigating the interior of buildings, as GPS signals typically cannot penetrate ceilings and walls. As shown in block 400, the distance to the computing device 12 is obtained using various wireless modalities from the fixed location antennas 20, including laser, lidar, and others known in the art. The distance information is transmitted to the computing device 12 according to a block 400, where it is processed as described above. Although the RAS 18 may be utilized in the embodiments of the present disclosure, alternative positioning technologies such as GNSS (Global Navigation Satellite System) that employ various augmentation systems to enable location tracking in places where the satellite signals are unreachable may be substituted.

Measurements from the GPS module 16 are directly received on the computing device 12, and processed by the app 36. It may be possible to increase the accuracy of the GPS location data by utilizing long data collection, in accordance with a block 404. As will be recognized by those having ordinary skill in the art, long data collection refers to obtaining multiple location data points within a predefined time period, such as 15 to 30 seconds. It is understood that accuracy of a quarter inch is possible, though with increased time requirements. Long data collection extending one second, for example, may be capable of achieving a location accuracy of around one foot, while long data collection extending five seconds may be capable of achieving a location accuracy of around five feet.

Figure 8:
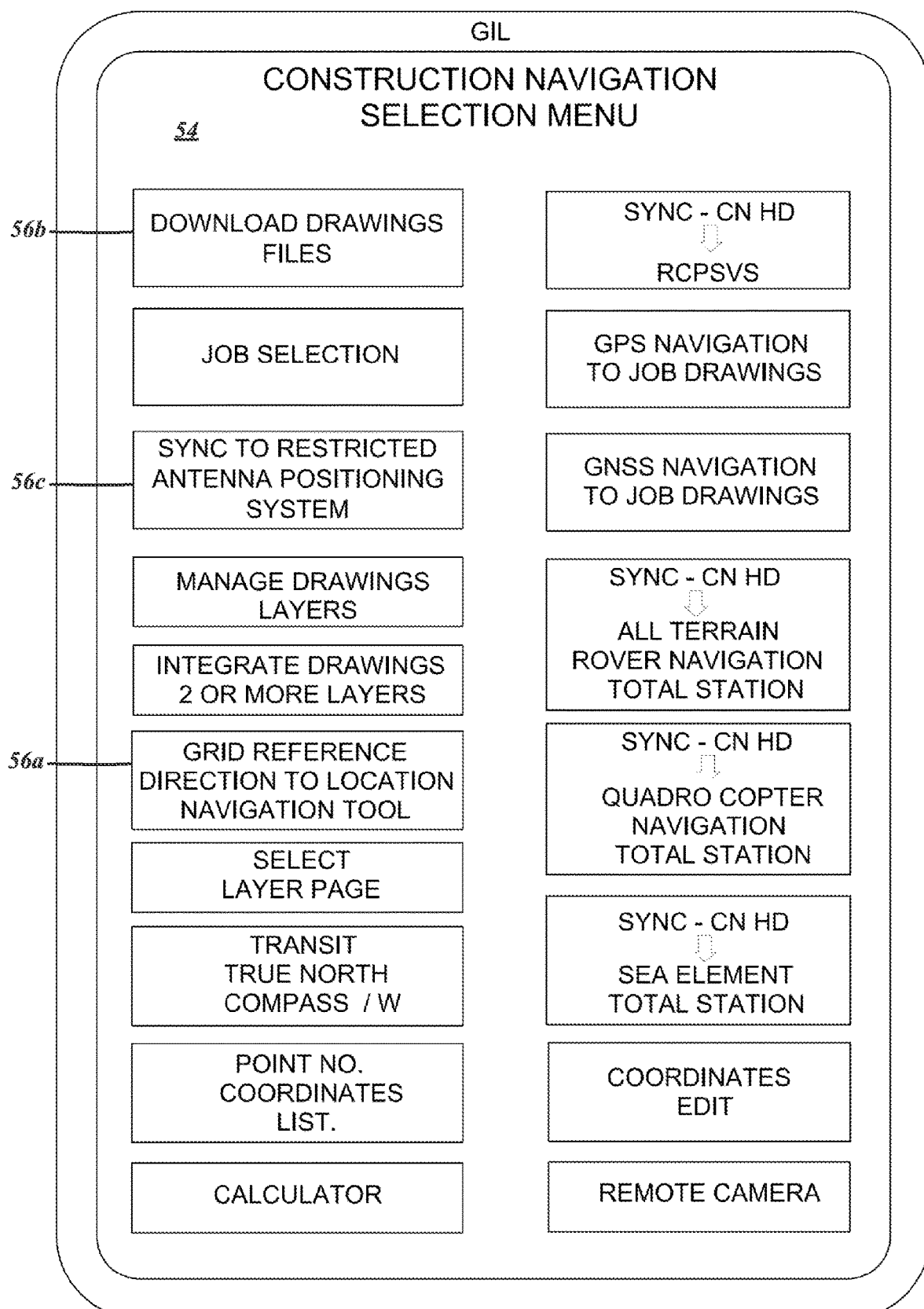
FIG. 8 is an exemplary screen capture of a menu interface showing the different functions that may be implemented on the computing device of the present disclosure.

In addition to the aforementioned interface for viewing and navigating the project drawings 28 as shown in FIG. 5 above, other features of the app 36 are contemplated. The screen capture of FIG. 8 depicts a menu interface 54 that also includes various activatable buttons 56 that may be selected to initiate different procedures. The aforementioned screen to navigate the project drawings 28 may be accessed by activating a button 56a.

As indicated above, it is possible to load and view multiple project drawings 28 from the computing device 12, and FIG. 9 illustrates one exemplary implementation of a project management interface 58. This screen may be accessed by activating a button 56b. From this screen, a new "job" or collection of project drawings 28 may be defined, and accordingly includes a text entry box 59 that accepts name entries for the "job." Furthermore, the drawing file type, one of a 3D/CAD file, a BIM file, or a direct capture from a 3D scanner, may be selected amongst buttons 60a-60c. Additionally, the name of the layer to which the project drawing 28 may be assigned can be defined via a text entry box 62.

Before the computing device 12 is able to receive location data 14 from the RAS 18, a connection may be manually established between them. By selecting a button 56c, synchronization setup interface 64 as shown in FIG. 10 may be invoked. The first set of checkboxes 66 indicate whether the RAS 18 is paired with the computing device 12, that is, a whether a data communications connection has been established. The second set of checkboxes 68 indicate whether the view of the project drawings 28 are synchronized with the location data 14 that is being transmitted to the computing device 12. Along these lines, connections to other surveying devices on board remotely controlled vehicles such as all-terrain rovers, quad-copters, and watercraft may also be established via the menu interface 54.

It is further contemplated that the app 36 loaded on to the computing device 12 may include additional features that utilize various hardware components of the computing device. For example, the application may further include a "tape measure" component capable of calculating and displaying the distance between various points on the site. This tape measure component may utilize GPS information, accelerometer information from the device, or calculating distances using camera information from the device. For example, the user may want to determine the distance between two points and set a start point in the application and then walk to a second point. The distance between the start point and the second point may be calculated by the application using the GPS coordinates of the two points. Alternatively, the application may utilize accelerometer data from the device to determine the distance travailed by the user to give a distance estimate, similar to a pedometer. This accelerometer information may use the data and interpret it in comparison to a standard user or, for greater precision, the user may input his height and/or other relevant information to give greater precision as to the distance of each step. This distance information may then be displayed on the device.

The application may further include a "survey transit" component capable of showing the direction the computing device 12 is facing and calculating angles and distances between points or items at the site. This survey transit component may utilize internal compass information from the device, accelerometer information from the device, and/or camera information from the device. For example, by utilizing compass information provided by the device, the app may visually display the compass bearing. Further, the application may utilize accelerometer data from the device to calculate and display the elevation angle of the device. By utilizing this bearing information and elevation angle information, the application is capable of calculating and displaying angles and distances between points or items at the site. For example, the user of the device may point the device toward a point or object at the site to which the angle or distance from a current location is needed. The camera information of the device, in conjunction with the compass and accelerometer information, may then be used to calculate the distance to the desired point or object by standard trigonometric means.

Further the application may utilize the camera and display of the device to feature an augmented reality component, wherein the specific site information from the project drawings 28, the tape measure, and/or survey transit features and information may be overlaid upon the site using known augmented reality methods. For example, the camera information from the computing device 12 may be displayed upon the display screen to display the site surroundings in the direction the device is currently being pointed. Then, upon this camera information, specific site information (such as a floor plan) may be overlaid, along with bearing, elevation, distance to a point, and other relevant information calculated by the application. This allows the user of the application to see the intended construction overlaid directly upon the current location at the site for general placement information.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show details of these embodiments with more particularity than is necessary for the fundamental understanding of the present disclosure, the description taken with the drawings making apparent to those skilled in the art how the several forms of the present disclosure may be embodied in practice.

What is claimed is:

1. A system for displaying a position of a computing device within a construction site, the system comprising:
    a computing device operable to generate location data associated with a current position of the computing device; and
    a display screen operable to display one or more project drawings corresponding to the construction site with a position marker corresponding to the current location of the computing device as derived from the location data.

2. The surveying system of claim 1, wherein the display screen is operable to adjust the display of the one or more project drawings in response to a change in position of the computing device.

3. The surveying system of claim 1, wherein the display screen is on a handheld device.

4. The surveying system of claim 3, wherein the display screen is on a cellular phone.

5. The surveying system of claim 3, wherein the display screen is on a tablet.

6. The surveying system of claim 1, wherein the display screen comprises a touch screen.

7. The surveying system of claim 1, wherein the location data is derived with reference to one or more fixed locations.

8. The surveying system of claim 7, wherein the location data is derived from a distance to the computing device from the one or more fixed locations obtained using a laser.

9. The surveying system of claim 7, wherein the location data is derived from a distance to the computing device from the one or more fixed locations obtained using lidar.

10. The surveying system of claim 1, wherein the location data is derived using one or more global positioning system (GPS) receivers.

11. The surveying system of claim 7, wherein the computing device communicates with a plurality of fixed location antennas via a portable antenna module in communication with the computing device.

12. The surveying system of claim 11, wherein the portable antenna module includes an antenna receptive to signals from at least one of the plurality of fixed location antennas.

13. The surveying system of claim 11, wherein the portable antenna module is integrated into an external case of the computing device.

14. The surveying system of claim 1, wherein the one or more project drawings are in a universal format.

15. The surveying system of claim 14, wherein the universal format is portable document format (PDF).

16. The surveying system of claim 14, wherein the universal format is computer aided design (CAD).

17. The surveying system of claim 14, wherein the universal format is building information modeling (BIM).

18. A memory storing software instructions executable by a processor to perform operations for displaying a position of a computing device within a construction site, the operations comprising:
    receiving location data associated with a current position of a computing device; and
    displaying one or more project drawings corresponding to the construction site with a position marker corresponding to the current location of the computing device as derived from the location data.

19. A method of displaying a position of a computing device within a construction site, the method comprising:
    receiving location data associated with a current position of a computing device; and displaying one or more project drawings corresponding to the construction site with a position marker corresponding to the current location of the computing device as derived from the location data.

20. The method of claim 19, further comprising adjusting the position marker in response to a change in the current position of the computing device within the construction site.

21. The method of claim 19, further comprising converting longitude/latitude data of a set of coordinates corresponding to the current position of the computing device within the construction site to Cartesian coordinates indexed to the one or more project drawings.

22. The method of claim 19, further comprising:
deriving multiple sets of coordinates from the location data over a predefined time period; and
generating an average of the multiple sets of coordinates;
wherein the current location of the computing device is derived from the average.

\* \* \* \* \*